# 2,744,810

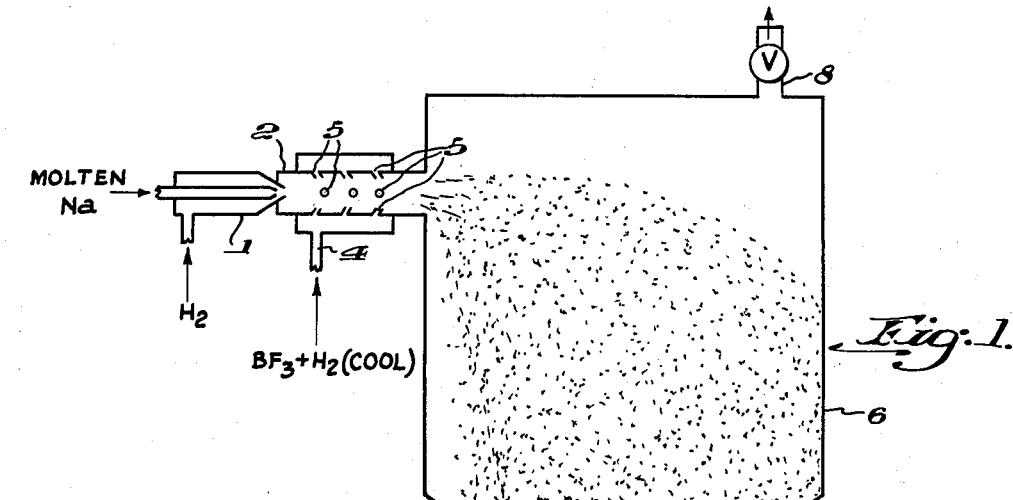
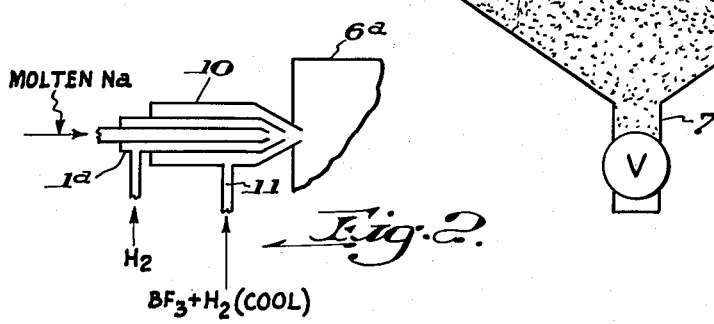
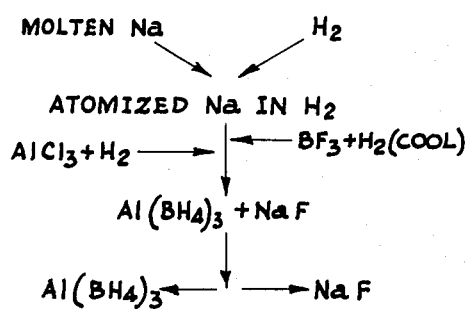
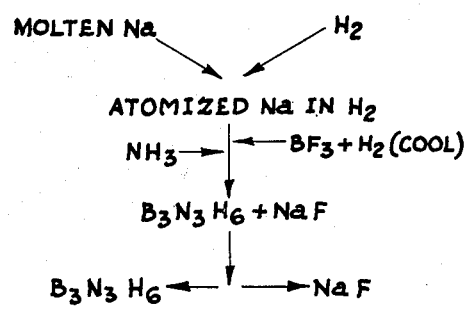
INVENTOR.
CAREY B. JACKSON.

PRODUCTION OF COMPOUNDS CONTAINING BORON AND HYDROGEN

Carey B. Jackson, Forest Hills, Pa., assignor, by mesne assignments, to Callery Chemical Company, Pittsburgh, Pa., a corporation of Pennsylvania Application June 8, 1951, Serial No. 230,595

3 Claims. (Cl. 23—14)

This invention relates to the production of compounds containing boron and hydrogen.

The invention provides a method of making compounds of boron and hydrogen such, for instance, as boron hydrides or boranes, for example, diborane ($B_2H_6$) and pentaborane ($B_5H_9$). The invention is applicable likewise to the production of other compounds containing boron and hydrogen, such as the metallic borohydrides, examples being the alkali metal borohydrides ($MBH_4$) and aluminum borohydride ($Al(BH_4)_3$), as well as to the production of such nitrogen containing boron hydrides as borazole ($B_3N_3H_6$).

The metallic borohydrides are excellent reducing agents, they provide efficient sources of hydrogen, and they may be used for the production of diborane and related boranes, which in turn are desired for certain purposes, e. g., by thermal conversion to other boron hydrides. The methods known previously for the production of boranes and metallic borohydrides are characterized by low yields or they require highly skilled operating technique. Generally speaking, they are adapted only to batch operation, and the products as made by procedures known heretofore are consequently quite expensive.

The primary object of the invention is to provide a simple and easily performed method for making compounds containing boron and hydrogen which is efficient, may be practiced with readily available and inexpensive starting materials, is not dependent upon highly skilled operating technique, and is more direct and more easily practiced to provide these products at less expense than is the case with previously known methods.

A further object is to provide a method embodying the foregoing object and which is adapted to continuous operation.

Another object is to provide metallic borohydrides in a form exhibiting low bulk density and of exceptionally high activity.

A further object is to provide boron hydrides and metallic borohydrides in accordance with the foregoing objects.

Still other objects will be recognized from the following specification, including the production of borazole.

The invention will be described in connection with the accompanying drawings in which Fig. 1 is a schematic representation of one form of apparatus for use in the practice of one embodiment of the invention for the production of boranes and alkali metal borohydrides; Fig. 2 a schematic view of another embodiment of apparatus for the same purpose; and Figs. 3 and 4 simplified flow diagrams illustrative of the application of the invention to the production of, respectively, aluminum borohydride and borazole.

In all embodiments of the invention, whether for the production of boranes, metallic borohydrides or nitrogen-containing boron hydrides, an alkali metal, for example sodium (Na), is atomized in the molten state in a fluid, and there are introduced into the resultant dispersion, concurrently or successively, hydrogen and a boron-containing reagent. Inasmuch as some products obtainable in the practice of the invention are sensitive to moisture, the reaction is performed in a closed system and with all of the reagents carefully dried.

The term "boron-containing reagent" is used herein to designate boron halides, such as boron trifluoride ($BF_3$), boron trichloride ($BCl_3$), and the organic addition products of boron halides of which a considerable number are known, as well as alkyl borates, e. g., methyl and ethyl borates: [$B(OMe)_3$; $B(OEt)_3$].

In the simplest embodiment of the invention boranes or alkali metal borohydrides are produced, depending upon the proportion of the alkali metal and the boron-containing reagent. For example, sodium borohydride may be produced in accordance with the following typical reactions:

I.  $4Na + 2H_2 + BF_3 = NaBH_4 + 3NaF$ 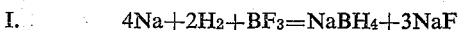
Ia. $4Na + 2H_2 + B(OCH_3)_3 = NaBH_4 + 3NaOCH_3$ 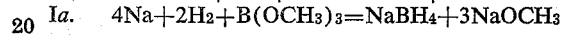

With different proportions of the two reagents diborane is the primary product as represented by the following reaction:

II. $6Na + 3H_2 + 2BF_3 = B_2H_6 + 6NaF$ 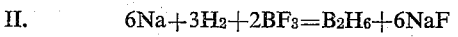

Of course, other alkali metals, such as potassium (K) or lithium (Li), or mixtures of alkali metals, such as sodium-potassium alloys, and other boron halides and their organic addition compounds may be applied to the foregoing reactions with corresponding production of alkali metal borohydride in reaction I or Ia, and with corresponding production of boron hydride in reaction II. Likewise, under ordinary conditions neither reaction I (or Ia) nor reaction II will proceed to the exclusion of the other, i. e., minor amounts of diborane may be produced using the proportions of reaction I or Ia, while minor proportions of alkali metal borohydride will result when using the proportions of reaction II.

In all embodiments of this invention the dispersion of alkali metal in a fluid is produced by atomization of molten alkali metal by any suitable means into a current of dry hydrogen, desirably to disperse the alkali metal as finely as possible. It is preferred to use for this purpose a spray gun device of known type in which the metal is aspirated and dispersed by dry hydrogen supplied under pressure and in heated condition to avoid chilling the metal and to accelerate the ensuing reaction. Of course, the alkali metal may be fed to the spray gun by application of an inert gas, e. g., nitrogen, to the surface of the metal in the container in which it is melted.

I now believe that the alkali metal and hydrogen react upon contact with formation of sodium hydride (NaH) and with liberation of heat, and that the sodium hydride reacts with the boron-containing reagent. Sodium hydride begins to decompose at about 500° C. Consequently, conditions are adjusted so that reaction occurs between about 150° to 350° C. In this embodiment this may be accomplished most suitably by introducing cool hydrogen into the zone of atomization or shortly beyond it, suitably by entraining the boron-containing reagent with unheated or cooled hydrogen.

The reaction products are passed into a closed collecting chamber in which the solid products settle to the bottom while gaseous products, such as boranes and excess hydrogen, are withdrawn for appropriate recovery.

Other compounds containing boron and hydrogen than those exemplified by reactions I, Ia and II may be produced in similar manner by introducing further reagent into the system concurrently with or following the introduction of alkali metal, hydrogen and boron-containing reagent. Such modified embodiment is adapted to the production of borohydrides of metals that cannot be atomized at the relatively low temperatures applicable to the alkali metals. For example, by introducing anhydrous aluminum halide into the reaction stream aluminum borohydride will be produced in accordance with the following over-all reaction:

III.  $12Na + 6H_2 + 3BF_3 + AlCl_3 = Al(BH_4)_3 + 12NaF$

As in the preceding cases, other alkali metals, boron-containing reagents and aluminum halides may be used although aluminum chloride is preferred. The aluminum chloride is suitably introduced into the system by vaporizing it and entraining the vapor in a current of dry, cool hydrogen.

Also, the reaction between alkali metal, hydrogen and boron-containing reagent may be further modified by the use of dry gaseous ammonia in similar fashion to produce borazole. In this instance the over-all reaction is:

IV.  $9Na + 3BF_3 + 3NH_3 \xrightarrow{H_2} B_3N_3H_6 + 9NaF + 3/2H_2$

Having reference now to Fig. 1 of the drawings, dry hydrogen at, for example, 50 to 75 p. s. i. g. pressure and 200° C. is introduced into a spray gun 1 of the type that has been used for the atomization of metals, to aspirate molten sodium from a source, not shown, and atomize it into a tubular metallic reaction chamber 2. In the embodiment shown reaction chamber 2 is surrounded by a closed metallic casing 3 into which a mixture of boron trifluoride and cool hydrogen is introduced from a source, not shown, through a conduit 4. This latter gaseous mixture passes into reaction chamber 2 forwardly of the orifice of spray gun 1 through a plurality of openings 5 inclined in the direction of flow of the reacting materials through chamber 2. To insure prompt and thorough mixing, openings 5 are disposed both longitudinally and peripherally of chamber 2, as shown. The reaction products pass into a collecting chamber 6 of large volume provided with a valved outlet 7 at the bottom for withdrawal of solid materials, and with a valved outlet 8 at the top for withdrawal of gaseous products.

In the preferred practice of the invention the normally solid products of reaction are chilled below their melting point substantially as rapidly as formed. In this way solid products are obtained in a light fluffy condition of low bulk density and of high exposed surface area with consequent exceptionally high reactivity. This is preferably accomplished by the introduction of cool hydrogen in sufficient volume relative to its temperature and the requisite chilling, most suitably in admixture with the boron-containing or further reagent, as described above.

In the case of reactions I and Ia the solid product is sodium fluoride which may be withdrawn periodically through outlet 7, the valve of which is of known type that prevents entry of air and moisture into the collecting chamber. The diborane and excess hydrogen, together with any unreacted boron-containing reagent, are withdrawn through valved outlet 8 and treated appropriately to recover the diborane; the hydrogen and any excess boron-containing reagent may be separated and recovered, if desired. If the latter two are recovered they may be recycled, as will be clear. In the case of reaction II the solid product consists of a mixture of sodium borohydride and sodium fluoride which is withdrawn through outlet 7 and treated to recover the two products separately by any appropriate means, as by extraction of the NaBH4 with liquid NH3. The gaseous products, consisting of any borane formed, hydrogen and unreacted boron-containing reagent are withdrawn from outlet 8 and discarded or treated to recover one or more of them.

Fig. 2 illustrates a modified embodiment of apparatus in which sodium is aspirated and atomized as in the case of Fig. 1 by means of a spray gun 1a. In this instance the orifice of spray gun 1a is surrounded by a casing 10 into which a current of boron-containing reagent and cool, dry hydrogen is passed through a conduit 11 whereby to bring the boron-containing reagent into contact with the stream of atomized alkali metal and hydrogen as it emerges from the spray gun 1a. From casing 10 the reaction mixture passes into a collecting chamber 6a as in the case of Fig. 1.

As shown in Fig. 3 sodium is atomized by means of hydrogen and treated with a current of boron-containing reagent and cool hydrogen, and concurrently or promptly thereafter there is introduced into the flowing stream a current of anhydrous aluminum chloride and hydrogen with production of aluminum borohydride and sodium fluoride which are collected in a suitable collecting chamber, withdrawn, and appropriately separated and recovered.

Fig. 4 illustrates in similar fashion how borazole may be made in accordance with the invention and as described above.

Although the invention has been described, by way of example, with reference to atomization of the alkali metal by aspiration it will be understood that it may be dispersed otherwise, as by application of positive pressure to a body of molten alkali metal to hydraulically force it to and through an atomizing device.

Also, instead of diborane the method may be operated to produce, directly, mixtures of boron hydrides of greater molecular weight than diborane but which may include some amount of $B_2H_6$. Thus, $B_2H_6$ may be converted pyrolitically in the reaction zone to pentaborane, i. e., diborane may be the primary product but be converted by pyrolysis to pentaborane which is recovered and any residual diborane recycled.

According to the provisions of the patent statutes, I have explained the principle and mode of practicing my invention and have illustrated and described what I now consider to represent its best embodiment. However, I desire to have it understand that, within the scope of the appended claims, the invention may be practiced otherwise than as specifically illustrated and described.

I claim:

1. A method of making an alkali metal borohydride comprising atomizing, in a closed system, an alkali metal in a current of dry hydrogen at a temperature of about 150° to 350° C., and promptly reacting the atomized metal with a mixture of dry cool hydrogen and boron fluoride introduced into the system, said hydrogen being supplied in an amount not less than stoichiometric proportion and said boron fluoride and alkali metal in a stoichiometric amount for the reaction $$4X + 2H_2 + BF_3 \rightarrow XBH_4 + 3XF$$

wherein X represents an alkali metal, and separating said borohydride from the other products of reaction.

2. A method according to claim 1, said metal being sodium.

3. A method according to claim 1, said hydrogen being supplied in an amount to chill the alkali metal borohydride below its melting point as promptly as it is formed.

References Cited in the file of this patent

UNITED STATES PATENTS

| | | |
|---|---|---|
| 2,065,218 | Garesche | Dec. 22, 1936 |
| 2,313,028 | Siegmann | Mar. 2, 1943 |
| 2,469,879 | Hurd | May 10, 1949 |
| 2,532,217 | Winternitz | Nov. 28, 1950 |
| 2,534,533 | Schlesinger et al. | Dec. 19, 1950 |
| 2,542,746 | Banus et al. | Feb. 20, 1951 |
| 2,544,472 | Schlesinger et al. | Mar. 6, 1951 |
| 2,550,985 | Finholt | May 1, 1951 |
| 2,567,972 | Schlesinger et al. | Sept. 18, 1951 |
| 2,576,311 | Schlesinger et al. | Nov. 27, 1951 |
| 2,685,501 | Spevack | Aug. 3, 1954 |

(Other references on following page)

OTHER REFERENCES

Final Report, Navy Contract NOa (s) 9973, Bureau of Aeronautics, "The Preparation of Pentaborane and the Evaluation of the Hazards of Handling Diborane and Pentaborane," prepared by Mine Safety Appliance Co., printed Dec. 1, 1950, pages 12–13.

Schechter et al.: "Boron Hydrides and Related Compounds," prepared under Contract NOa (s) 10992 for Dept. of Navy, Bureau of Aeronautics, prepared by Callery Chemical Co., printed Mar. 1951, Declassified Dec. 1953, page 40.